(12) United States Patent
Liu et al.

(10) Patent No.: US 7,682,525 B2
(45) Date of Patent: Mar. 23, 2010

(54) MATERIAL COMPOSITION FOR PRODUCING BLUE PHOSPHOR BY EXCITATION OF UV LIGHT AND METHOD FOR MAKING THE SAME

(75) Inventors: Ru-Shi Liu, Jhongli (TW); Ivan Baginskiy, Jhongli (TW); Ting-Shan Chan, Jhongli (TW); Jenq-Yang Chang, Jhongli (TW)

(73) Assignee: National Central University, Taoyuan (TW)

( * ) Notice: Subject to any disclaimer, the term of this patent is extended or adjusted under 35 U.S.C. 154(b) by 309 days.

(21) Appl. No.: 11/768,908

(22) Filed: Jun. 27, 2007

(65) Prior Publication Data

US 2009/0001319 A1    Jan. 1, 2009

(51) Int. Cl.
  *C09K 11/59* (2006.01)
  *C09K 11/55* (2006.01)
(52) U.S. Cl. .............................. 252/301.4 F
(58) Field of Classification Search ............ 252/301.4 F
  See application file for complete search history.

(56) References Cited

U.S. PATENT DOCUMENTS

| | | |
|---|---|---|
| 6,621,211 B1 | 9/2003 | Srivastava et al. |
| 6,809,347 B2 | 10/2004 | Tasch et al. |
| 6,943,380 B2 | 9/2005 | Ota et al. |
| 2006/0011936 A1* | 1/2006 | Hiramatsu et al. .......... 257/100 |

FOREIGN PATENT DOCUMENTS

TW        533604        5/2003

OTHER PUBLICATIONS

J. Electochem. Soc: Solid State Science. 115, 1181-1184 (1968) "Fluorescence of Eu2+-Activated Phases in Binary Alkaline Earth Orthoscilicate Systems".

* cited by examiner

Primary Examiner—C. Melissa Koslow
(74) Attorney, Agent, or Firm—Chun-MIng Shih

(57) ABSTRACT

A phosphor material composition for producing blue phosphor by the excitation of UV light and a method for making the same. The phosphor material is an alkaline-earth silicates compound with a chemical formula of $A_{2-x}SiO_4:Ce_x$. A includes one or more elements selected from the collection of Ba, Sr and Ca alkaline-earth metals. The host is $A_{2-x}SiO_4$ and the activator is $Ce^{3+}$. The characteristic of this invention is the blue phosphor material with a high luminescence intensity that can be excited by UV light. In addition, the material in this invention is easy and fast to prepare in a large amount, and the material itself has advantage such as color purity and thermal stability, so as to have a high industrial value.

4 Claims, 3 Drawing Sheets

MATERIAL COMPOSITION FOR PRODUCING BLUE PHOSPHOR BY EXCITATION OF UV LIGHT AND METHOD FOR MAKING THE SAME

FIELD OF THE INVENTION

The present invention relates to a phosphor material composition for producing blue phosphor by the excitation of ultraviolet (UV) light and a method for making the same, and more particularly to a material such as an alkaline-earth silicates compound primarily using cerium as a light emitting activator, and the material with the advantages of high color purity and thermal stability is applicable for the excitation of UV light, and the method is simple and easy, and the material can be produced in a large quantity easily.

BACKGROUND OF THE INVENTION

In 1996, Nichia Corporation developed a blue-light InGaN light emitting diode (LED) to gather with a yellow-light Ce-doped yttrium aluminum garnet (YAG:Ce) phosphor powder using cerium as a light emitting activator to form a white-light light source and unveil the white-light LED market. White-light LED has the advantages of energy saving and environmental protection over traditional light sources and complies with the global development trend of green lights. At present, white-light LED is considered as the illumination light source of the 21$^{st}$ Century and one of the severe competitions for the business opportunity among world's major optoelectronic semiconductor manufacturers, and the industrial values and environmental protection effects derived from the white-light LED are immeasurable.

Compared with the white-light LED adopting the blue-light LED together with the YAG:Ce phosphor powder, the ultraviolet light emitting diode (UV-LED) using 360~400 nm ultraviolet as an excitation source and conforming with red, green and blue phosphor powders to form a white light having a higher light emitting efficiency and a better color rendering. However, the highly efficient red, green and blue phosphor powders applicable for ultraviolet light is not easily found in the market, and it is necessary to take the efficiency of different powders into consideration for the actual process of packaging white-light LED, and thus the level of difficulty for mixing powders become higher, and the prior art requires further breakthroughs for practical applications.

At present, alkaline-earth silicates compounds are primarily used as a phosphor powder for the excitation of blue light or ultraviolet light, and many manufacturers including OSRAM, GE, Toyota Gosei, Tridonic, and Intermatix have adopted these compounds for the manufacture, and alkaline-earth silicates compound related literatures and patents are described as follows:

The content of $(Ba, Sr, Ca)_2SiO_4:Eu^{2+}$ disclosed [J. Electochem. Soc: Solid State Science. 115, 1181-1184 (1968)] by a Thmoas group is the earliest alkaline-earth silicates compound used as a phosphor powder, and its host lattice is a solid solution of $(Ba,Sr,Ca)_2SiO_4$, and its light emitting activator is bivalent europium ($Eu^{2+}$), but this journal did not teach its use for the excitation of LED. Thereafter, the content of $(Ba,Sr,Ca)_2SiO_4:Eu^{2+}$ disclosed by GE in U.S. Pat. No. 6,621,211 is the earliest phosphor powder of alkaline-earth silicates compound used for the excitation of LED, and its activator is also a bivalent europium ($Eu^{2+}$), and the method of producing white light is achieved mainly by exciting the ultraviolet light; and the 360~420 (nm) LED is excited by the phosphor powder of at least three colors: red (R), green (G) and blue (B).

And then, Toyota Gosei, Tridonic optoelectronic GmbH and Lite GBR, Leuchstoffwerk Breitungen GmbH jointly developed an ultraviolet (UV) white-light LED, and patents were issued to U.S.A. and Taiwan (including U.S. Pat. Nos. 6,809, 347B and 6,943,380B, and TW Pat. No. 533,604B). The contents disclosed in the patents include one of the alkaline-earth silicates compounds excited by a bivalent europium ($Eu^{2+}$) or a mixture of the following compounds:

(a)$(2-x-y)SrO.x(Ba,Ca)O.(1-a-b-c-d)SiO_2.aP_2O_5bAl_2O_3cB_2O_3dGeO_2:yE^{2+}$, wherein $0<x<1.6$, $0.005<y<0.5$, $x+y\leq 1.6$, $0<a, b, c, d<0.5$;

(b)$(2-x-y)SrO.x(Ba,Ca)O.(1-a-b-c-d)SiO_2.aP_2O_5bAl_2O_3cB_2O_3dGeO_2:yEu^{2+}$, wherein $0.01<x<1.6$, $0.005<y<0.5$, $0<a, b, c, d<0.5$.

The aforementioned phosphor materials can be used for exciting blue light or ultraviolet light to radiate yellow-green, yellow or orange spectra, and the color temperature of the white light and the color can be adjusted by changing the proportion of variables.

SUMMARY OF THE INVENTION

In view of the aforementioned literatures and patents, the light emitting activator is selected from a bivalent europium ($Eu^{2+}$), and yellow-green as well as yellow to orange lights are radiated under the excitation of blue light or UV light. At present, no alkaline-earth silicate related patent using a trivalent cerium ($Ce^{3+}$) as the activator for radiating blue lights yet. Therefore, the inventors of the present invention based on years of experience in the related field to conduct extensive researches and experiments, and finally developed and invented a phosphor material composition for producing blue phosphor by an excitation of ultraviolet light and a method for making the same.

The present invention is to provide a phosphor material composition for producing blue phosphor by an excitation of ultraviolet light and a method for making the same, and an alkaline-earth silicate uses cerium as a light emitting activator, and the phosphor material comes with a chemical formula: $A_{2-x}SiO_4:Ce_x$, wherein A is one or more alkaline-earth metals selected from the collection of barium (Ba), strontium (Sr) and calcium (Ca). In the chemical formula, $A_{2-x}SiO_4$ is a host lattice, and the trivalent cerium ($Ce^{3+}$) is a light emitting activator. The present invention is characterized in that the blue phosphor material composition having a high emissive strength and the material has the advantages of high color purity and thermal stability, which is applicable for the excitation of UV light. In addition, the material disclosed in the invention is easy and fast to prepare in a large amount, and thus having a high industrial value.

DETAILED DESCRIPTION OF THE PREFERRED EMBODIMENTS

Figure 1:
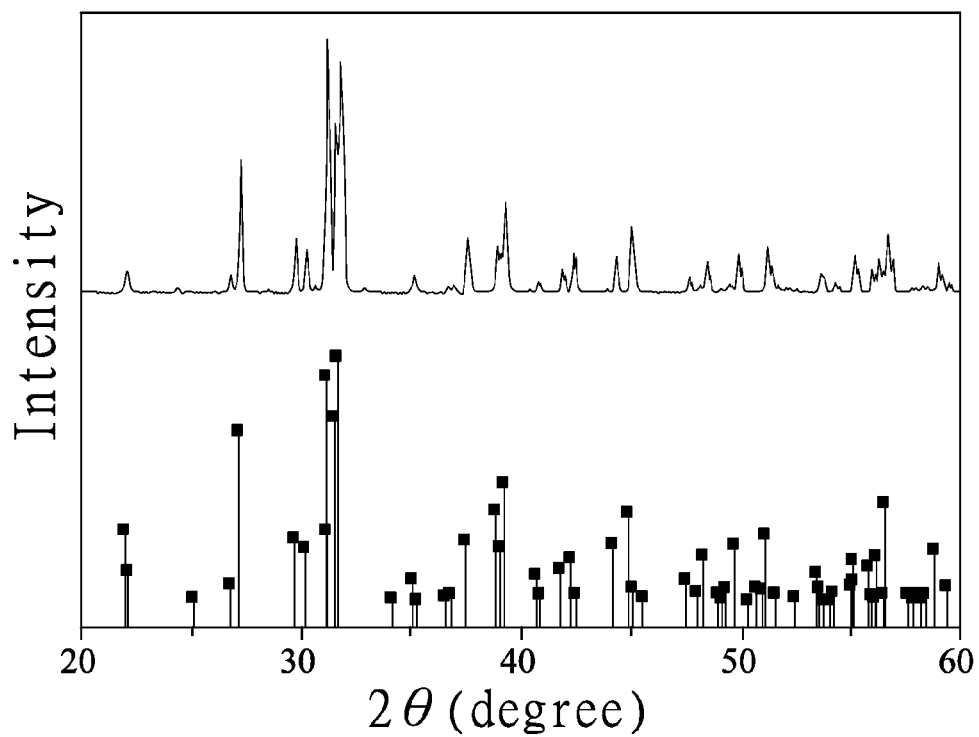
FIG. 1 shows an X-ray diffraction pattern of the sample of $Sr_{2-x}SiO_4:Ce_x$ (x=0.04) prepared in accordance with the present invention.

To make it easier for our examiner to understand the objective of the invention, its structure, innovative features, and performance, we use preferred embodiments together with the attached drawings for the detailed description of the invention.

The present invention discloses a phosphor material composition for producing blue phosphor by the excitation of ultraviolet (UV) light and a method for making the same. In a preferred embodiment of the invention, the phosphor powder of an alkaline-earth silicate and the method of making the same are described, and $Sr_{2-x}SiO_4:Ce_x$ is selected as the phosphor material of this embodiment, wherein the composite x falls within a range of ($0<x\leqq0.1$), and $Sr_{2-x}SiO_4:Ce_x$ in this embodiment is a host lattice, and x=0.04, and its manufacturing method is described as follows:

1. Firstly, a first reactant containing strontium (Sr) such as strontium carbonate ($SrCO_3$), a second reactant containing silicon (Si) such as silicon dioxide ($SiO_2$) and a third reactant containing cerium (Ce) such as cerium dioxide ($CeO_2$) are prepared according to a stoichiometric ratio to form $Sr_{2-x}SiO_4:Ce_x$, wherein x=0.04; and a solid state synthesis, a sol-gel process or a spray pyrolysis is used for the chemical combination.

2. After the reactants are mixed and ground thoroughly in a crucible, the uniformly mixed mixture is put into an aluminum oxide crucible, and then the aluminum oxide crucible is put into a square furnace and heated to 1100~1300° C. in an argon gas (Ar) environment with a temperature increase of 4° C./minute for 1~4 hours, and then the temperature is cooled to the room temperature at a cooling rate of 5° C./minute. In this embodiment, the mixture is sintered at 1250° C. for 2 hours, and then removed from the furnace and finally ground into powder.

3. The powder is put into an aluminum oxide crucible and heated under a reduction environment at 1100~1300° C. for 4~8 hours. In this embodiment, the mixture reduction environment having a mixture of hydrogen ($H_2$)/Nitrogen ($N_2$) in the ratio of 25%/75% is heated to 1250° C. at a temperature rise of 4° C./minute for the reduction, and then a constant temperature is maintained for 6 hours, and then cooled to the room temperature at a cooling rate of 5° C./minute. After the reduction and sintering processes are completed, the mixture is ground in a crucible into powders with uniform particulates to form a phosphor powder of a silicates compound $Sr_{2-x}SiO_4:Ce_x$ (x=0.04).

Each of the foregoing reactants such as strontium carbonate ($SrCO_3$), silicon dioxide ($SiO_2$) and cerium dioxide ($CeO_2$) is a merchandise available easily in the market, and the reactant strontium carbonate ($SrCO_3$) can be substituted by the strontium nitrate $Sr(NO_3)_2$ or strontium oxide (SrO) or produced by oxidizing a strontium metal directly, and the reactant silicon dioxide ($SiO_2$) can be substituted by tetraethylorthosilicate (TEOS), and the reactant cerium dioxide ($CeO_2$) can be substituted by cerium nitrate ($Ce(NO_3)_3$) or cerium carbonate ($Ce_2(CO_3)_3$) or produced by oxidizing a cerium metal directly. The third reactant containing cerium (Ce) further includes at least one material selected from oxides, carbonates, and nitrates.

Referring to FIG. 1 for a phosphor powder with the chemical formula of $Sr_{2-x}SiO_4:Ce_x$ (x=0.04) prepared in accordance with the present invention and the crystal purity is identified by X-ray diffractometer. The sample is compared with the pattern of the X-ray diffraction of a standard strontium silicates compound (ICSD no: 35667), and it is found that the phosphor powder of the silicates compound of the present invention is an orthorhombic structure with a lattice constant of a=5.6820, b=7.0900(1), c=9.7730(3) Å, and $\alpha=\beta=\gamma=90°$.

Figure 2:
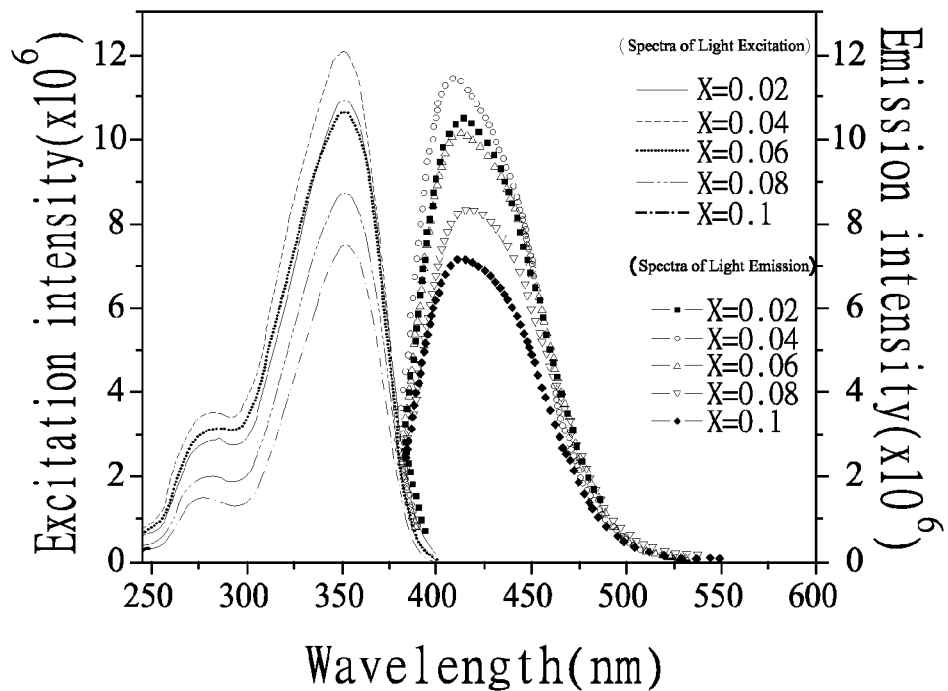
FIG. 2 shows spectra of a light excitation and a light emission of the samples of $Sr_{2-x}SiO_4:Ce_x$ ($0<x\leq 0.1$) prepared in accordance with the present invention.

Referring to FIG. 2 for the spectra of the excitation and emission intensity of phosphor powders of silicates compound $Sr_{2-x}SiO_4:Ce_x$ ($0<x\leqq0.1$), the phosphor powder material is applicable for the excitation of ultraviolet light, and the wavelength of the aforementioned excitation source falls within a range of 320 nm~380 nm, and the ultraviolet light is produced by a light emitting diode or plasma. In addition, the spectroscope of the emissions show that the maximum emissive wavelength is 410 nm, and the phosphor powders are of blue emission.

Figure 3:
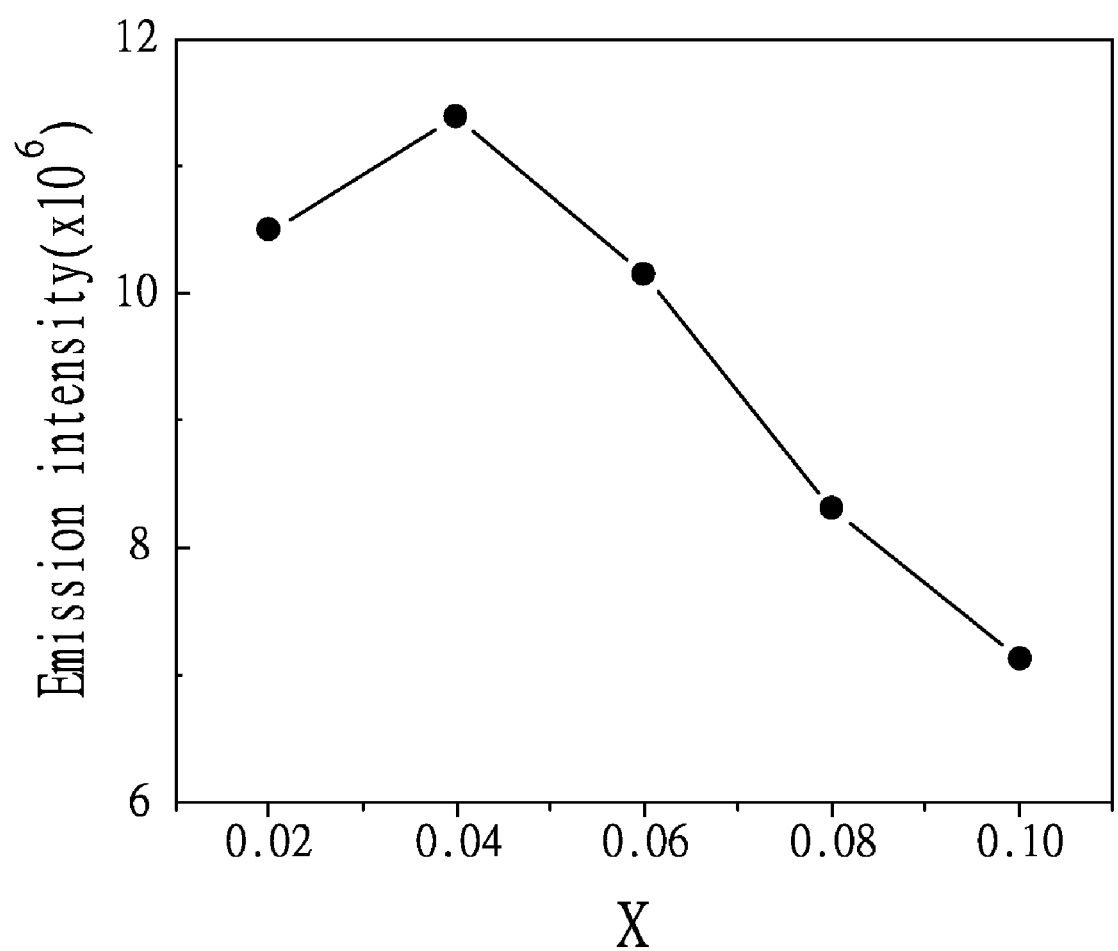
FIG. 3 shows a graph of the content of substituted cerium (Ce) versus the excitation intensity of a sample of $Sr_{2-x}SiO_4:Ce_x$ ($0<x\leq 0.1$) prepared in accordance with the present invention.

Referring to FIG. 3, a change of the cerium (Ce) content will affect the light emitting intensity of the phosphor powders of the silicates compound $Sr_{2-x}SiO_4$. Under the excitation of a light source at 360 nm, with the cerium (Ce) content is 0.04, the best light emitting intensity can be achieved.

Figure 4:
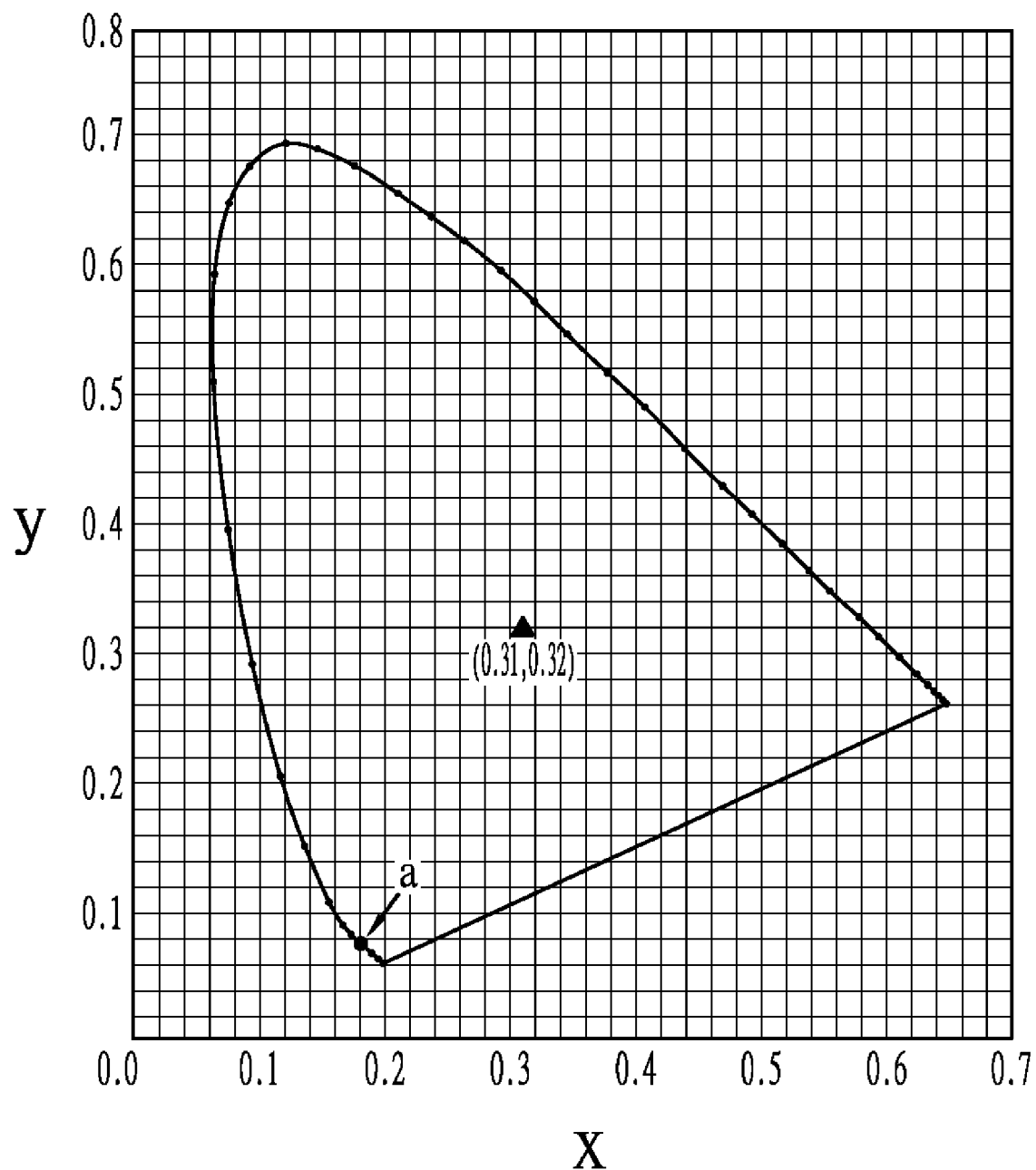
FIG. 4 shows CIE chromaticity coordinates converted from a light emission spectrum of a sample of $Sr_{2-x}SiO_4:Ce_x$ (x=0.04) as depicted in FIG. 2 by using a conversion program.

Referring to FIG. 4 for a chromaticity diagram of the data of the emissive spectra converted by a conversion formula established by the Commission International de 1, Eclairage (CIE) chromaticity coordinates in 1931, the emission spectra of the phosphor powder of a sample of the silicates compound $Sr_{2-x}SiO_4:Ce_x$ (x=0.04) at a point in FIG. 2 is converted into simulated chromaticity coordinates (0.1569, 0.0268), and the triangular symbol indicates the theoretical white-light position (0.31, 0.32). From the position indicated in the spectroscope, the phosphor material prepared by this embodiment of the invention is situated at coordinates of the blue color and it has excellent color saturation.

In summation of the description above, the present invention herein enhances the performance than the conventional structure and further complies with the patent application requirements and is duly submitted for patent application.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of making a phosphor material composition for producing a blue phosphor by excitation of UV light, and more particularly a method of making a phosphor material of an alkaline-earth silicates compound, comprising the steps of:

mixing a first reactant containing strontium (Sr), a second reactant containing silicon (Si) and a third reactant containing cerium (Ce) into a mixture;

heating the mixture in the argon gas environment at 1100~1300° C. for 1~4 hours to form an alkaline-earth silicate precursor; and heating the alkaline-earth silicate precursor in a reduction environment having a mixture of hydrogen ($H_2$)/Nitrogen ($N_2$) at 1100~1300° C. for 4~8 hours to form a finished good.

2. The method of making a phosphor material composition for producing a blue phosphor by excitation of UV light as recited in claim 1, wherein the third reactant containing cerium (Ce) includes at least one material selected from the collection of cerium oxide, carbonates and nitrates.

3. The method of making a phosphor material composition for producing a blue phosphor by excitation of UV light as recited in claim 1, wherein the mixture in the argon gas environment is heated to 1100~1300° C. by a temperature increase of 4° C./minute.

4. The method of making a phosphor material composition for producing a blue phosphor by excitation of UV light as recited in claim 1, wherein the alkaline-earth silicate precursor in the reduction environment is heated to 1100~1300° C. by a temperature increase of 4° C./minute.

* * * * *